April 8, 1930.  A. A. TACCHELLA  1,753,253
INTERNAL COMBUSTION ENGINE AND METHOD OF OPERATING SAME
Filed Sept. 4, 1923
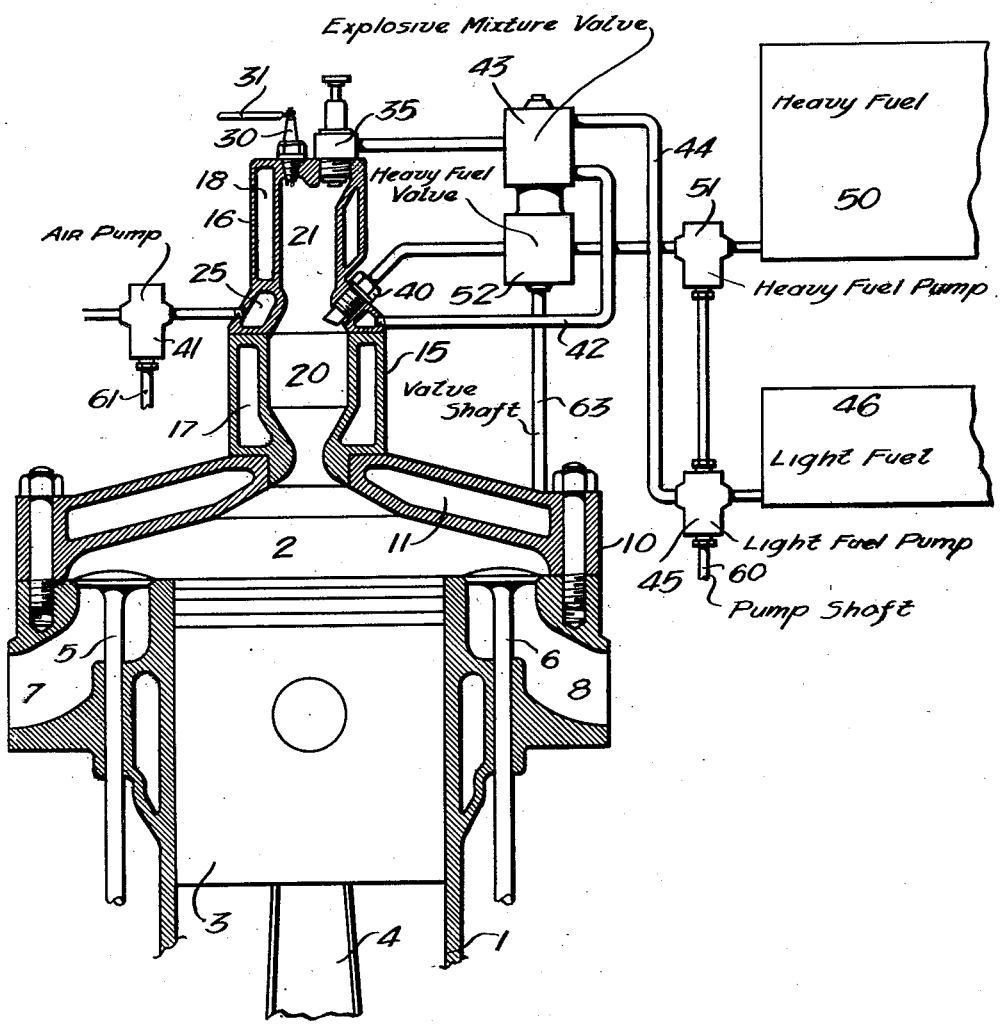
INVENTOR:
ADOLPH A. TACCHELLA,
BY
ATTORNEYS.

Patented Apr. 8, 1930

1,753,253

UNITED STATES PATENT OFFICE

ADOLPH A. TACCHELLA, OF BERKELEY, CALIFORNIA, ASSIGNOR TO THEODORE E. HAMMOND, OF LOS ANGELES, CALIFORNIA

INTERNAL-COMBUSTION ENGINE AND METHOD OF OPERATING SAME

Application filed September 4, 1923. Serial No. 660,961.

My invention relates to internal combustion engines of the low compression injection type.

The principal object of the invention is to provide means by which fuels heavier than gasoline or kerosene may be used in a low compression internal combustion engine. This is accomplished by providing in such an engine, means for efficiently conducting the necessary processes of atomization, vaporization and mixing of fuel vapors with the air so that very rapid combustion can be obtained, thus permitting these heavier fuels to be used in high speed engines.

The efficient operation of an internal combustion engine necessitates a very complete vaporization or gasification of the fluid and a very intimate mixture of the finely divided fluid with air prior to combustion. The rapidity and completeness of the combustion in the engine depends primarily upon the completeness of the vaporization of the fuel and upon the completeness of admixture with air. Many attempts have been made to devise means for utilizing heavy fuels in low compression internal combustion engines, but these previous attempts have been largely unsuccessful due to the fact that efficient means have not been previously devised for completely carrying on the steps mentioned above. In the Diesel engine the processes of injection, atomization, vaporization, mixture with air and combustion overlap each other. This method of operation is successful in the Diesel engine due to the fact that the compression and temperature in all parts of the engine combustion chamber is high enough to cause a rapid vaporization of the fuel and an ignition thereof. In low compression engines the temperature of the cylinder at the end of the compression stroke cannot be sufficiently high to insure rapid and complete vaporization even though the injected fuel may be very finely atomized.

In my invention I provide efficient means for vaporizing the fuel before it is mixed with air and before it is injected into the cylinder combustion chamber, means being provided for retaining the fuel in the vaporizing chamber for a sufficiently long time to insure its complete vaporization before it is injected into the cylinder combustion chamber where it is mixed with air. In the standard type of low compression internal combustion engine such as is commonly used on automobiles, the vaporization of the fuel and its mixture with air are accomplished by means of a carburetor. Various inventors have attempted to use heavy fuels in the same manner by adding means for pre-heating the air before mixing it with the fuel for the purpose of assisting in the vaporization. These attempts to utilize a heavy fuel in the standard form of low compression internal combustion engine have been successful to only a very limited degree.

My invention contemplates the use of a heavy fuel which is introduced in a highly atomized condition into a special vaporizing chamber which is kept at a sufficiently high temperature to insure complete vaporization of the fuel before its injection into the cylinder combustion chamber. My invention further contemplates the injection of the vaporized fuel into the combustion chamber of the engine by means of an explosion from an auxiliary explosion chamber, this explosion being utilized to violently force the vaporized heavy fuel into the cylinder combustion chamber where it is mixed with air and the mixture ignited. My invention further contemplates the use of an explosive mixture in the auxiliary explosion chamber which is formed independently of and preferably from a different source of fuel supply from that used as the main fuel for the engine.

Further objects and advantages will appear hereinafter.

Referring to the drawing which is merely for illustrative purposes:

The single figure is a diagram, partly in section showing a portion of an internal combustion engine suited to carry on my invention.

In this drawing, 1 represents a wall forming a cylinder explosion chamber 2, in which a piston 3 is free to reciprocate in the usual manner, this piston 3 driving a crank shaft, not shown, through a connection rod 4. An intake valve 5 and an exhaust valve 6 are provided, these valves closing an intake opening 7 and an exhaust opening 8 respectively. Secured on the top of the cylinder block 1 is a cylinder head 10 having a recess 11 therein, through which a cooling fluid, such as water, is preferably circulated. Centrally secured in the cylinder head 10 is a lower casing 15 and secured on the top of the lower casing 15 is an upper casing 16. The casing 15 is provided with a water cooling chamber 17 and the casing 16 is provided with a water cooling chamber 18. Formed inside the lower casing 15 is a vaporizing chamber 20 and formed inside the casing 16 is an auxiliary explosion chamber 21. Formed in the walls of the lower portion of the casing 16 is an air heating chamber 25. Secured in the top of the casing 16 and projecting into the chamber 21 is a spark plug 30, upon which an electromotive force is impressed at the proper instant by standard means, not shown, through an electric conductor 31. Also mounted upon the top of the upper casing 16 and projecting into the explosion chamber 21 is a light fuel injection nozzle 35. Secured in the casing 16 and projecting into the vaporization chamber 20 is a heavy fuel injection nozzle 40. Compressed air is supplied to the space 25 from an air pump 41, the compressed air being heated in the space 25 and conducted through a pipe 42 to an explosive mixture valve 43. The explosive mixture valve 43 is also supplied with a light fuel through a pipe 44 from a light fuel pump 45, this fuel being taken from a light fuel tank 46. Heavy fuel is taken from a heavy fuel tank 50 and forced by a heavy fuel pump 51 through a heavy fuel valve 52 into the heavy fuel injection nozzle 40. The pumps 45 and 51 are driven through suitable mechanism, not shown, from the mechanism of the engine through a pump shaft 60, the air pump being similarly driven through a shaft 61. The valves 43 and 52 are actuated from the mechanism of the engine through a valve shaft 63. The valves 5 and 6 and the valves 43 and 52 are so actuated that a regular cycle of operations is maintained, this cycle being as follows:

When applied to a four stroke cycle engine on the down stroke of the piston 3, the intake valve 5 opens and air is drawn into the cylinder explosion space 2, the exhaust valve being closed. On the upward or compression stroke of the piston 3, this air is compressed and during this compression the valves 43 and 52 are opened, heavy fuel being injected into the vaporizing chamber 20 through the heavy fuel injection nozzle 40, and an explosive mixture of light fuel and air is injected into the auxiliary explosion chamber 21 through the explosion mixture nozzle 35. The valve 43 is so constructed that the heated compressed air delivered through the pipe 42 and the light fuel under pressure delivered through the pipe 44 are intimately mixed, the light fuel being vaporized so that a highly explosive mixture is present in the auxiliary explosion chamber 21. The heavy fuel injected into the vaporizing chamber 20 is also finely atomized by the nozzle 40, the temperature of the vaporizing chamber being so regulated that the heavy fuel injected therein is thoroughly heated and vaporized during the compression stroke of the piston 3. At or near the end of the compression stroke, the engine is in proper condition for an efficient explosion to be started, since there exists a considerable volume of compressed air in the primary or engine combustion chamber consisting of the large clearance space in the top of the cylinder, this air being substantially free from fuel vapors, a body of compressed and atomized fuel in the secondary chamber 20, and a body of explosive mixture in the tertiary chamber 21. These three bodies of compressed gas or vapor are quite distinct and separate prior to the explosion.

At an instant determined by the setting of a distributor, not shown but standard in internal combustion engine practice and well known in the art, an electrical potential is impressed on the spark plug 30 causing a spark to pass at the terminals thereof and a violent explosion of the light fuel mixture takes place in the auxiliary explosion chamber 21. The valves 43 and 52 are, however, closed before this explosion takes place. This explosion causes a violent expansion in the auxiliary explosion chamber 21 and an extremely rapid flame propagation therein. This expansion forces the vaporized and heated heavy fuel downwardly into the engine combustion chamber above the piston 3, the vaporized heavy fuel being thereby intimately mixed with the air already under compression therein. The explosion in the auxiliary explosion chamber ignites the mixture of air and heavy fuel vapor thus formed in the engine combustion chamber. During and after this combustion a rapid expansion takes place in the engine combustion chamber, this expansion acting upon the top of the piston 3 and performing useful work thereon during the downward or expansion stroke of the piston 3. On the succeeding upward scavenging stroke of the piston 3, the exhaust valve 6 opens and the burned gases are forced from the engine combustion space. On the succeeding downward or intake stroke of the piston 3, the intake valve opens and the exhaust valve closes and air is taken into the cylinder, and the cycle is repeated. It will be noted that by the method above described I am able by the use of a small quantity of light fuel to build up a highly explosive mixture in the auxiliary explosion chamber 21. This light mixture is very easily exploded and produces a rapid, positive and extremely reliable explosion. By locating the auxiliary explosion chamber in the position shown, I am able to keep the temperature of the vaporizing chamber 20 much higher than the temperature in the explosion chamber, and as the heavy fuel injected therein is not mixed with air until after the auxiliary explosion occurs, I am able to apply heat thereto without danger of premature explosions or other difficulties. Since the heavy fuel is not injected into the engine through the auxiliary explosion chamber, I am able to keep this chamber at a low temperature without danger of heavy fuel condensing thereon or on the spark plug 30. It will thus be seen that by my invention I am able to use a heavy fuel without the difficulties and disadvantages that are heretofore found in its use.

I claim as my invention:

1. A method of burning a gaseous mixture to produce power, which comprises: producing a definite volume of compressed air substantially free from fuel gas or fuel vapor; vaporizing heavy fuel to produce a definite volume of heavy fuel vapor under pressure and adjacent to said compressed air; producing a definite volume of explosive mixture from a fuel having a materially lower flash point than said heavy fuel; and blowing said heavy fuel vapor into said compressed air by exploding said explosive mixture.

2. A method of burning a gaseous mixture to produce power, which comprises: producing a definite volume of compressed air substantially free from fuel gas or fuel vapor; vaporizing heavy fuel to produce a definite volume of heavy fuel vapor under pressure and adjacent to said compressed air; producing a definite volume of explosive mixture from a fuel having a materially lower flash point than said heavy fuel; maintaining said explosive mixture at a sufficiently low temperature to prevent premature explosion thereof; and blowing said heavy fuel vapor into said compressed air by exploding said explosive mixture.

3. A method of burning a gaseous mixture to produce power, which comprises: producing a definite volume of compressed air substantially free from fuel gas or fuel vapor; vaporizing heavy fuel to produce a definite volume of heavy fuel vapor under pressure and adjacent to said compressed air; heating said heavy fuel vapor to assist in its vaporization; producing a definite volume of explosive mixture from a fuel having a materially lower flash point than said heavy fuel; and blowing said heavy fuel vapor into said compressed air by exploding said explosive mixture.

4. A method of burning a gaseous mixture to produce power, which comprises: producing a definite volume of compressed air substantially free from fuel gas or fuel vapor; vaporizing heavy fuel to produce a definite volume of heavy fuel vapor under pressure and adjacent to said compressed air; heating said heavy fuel vapor to assist in its vaporization; producing a definite volume of explosive mixture from a fuel having a materially lower flash point than said heavy fuel; maintaining said explosive mixture at a sufficiently low temperature to prevent premature explosion thereof; and blowing said heavy fuel vapor into said compressed air by exploding said explosive mixture.

5. A method of burning a gaseous mixture to produce power, which comprises: producing a definite volume of compressed air substantially free from fuel gas or fuel vapor; vaporizing heavy fuel to produce a definite volume of heavy fuel vapor under pressure and adjacent to said compressed air; producing a definite volume of explosive mixture from a fuel having a materially lower flash point than said heavy fuel; and igniting said explosive mixture, said mixture being so situated that the explosion resulting from its ignition ignites said heavy fuel vapor and blows it into said compressed air.

6. A method of burning a gaseous mixture to produce power, which comprises: producing a definite volume of compressed air substantially free from fuel gas or fuel vapor; vaporizing heavy fuel to produce a definite volume of heavy fuel vapor under pressure and adjacent to said compressed air; producing a definite volume of explosive mixture from a fuel having a materially lower flash point than said heavy fuel; maintaining said explosive mixture at a sufficiently low temperature to prevent premature explosion thereof; and igniting said explosive mixture, said mixture being so situated that the explosion resulting from its ignition ignites said heavy fuel vapor and blows it into said compressed air.

7. In an internal combustion engine, the combination of: a cylinder block having a cylindrical bore; a piston moving in said bore but having its movement so limited that a considerable clearance space is left above the head of the piston at the end of its compression stroke, this clearance space forming an engine combustion chamber; walls forming a heavy fuel vaporizing chamber adjacent to and in open communication with but distinct from said engine combustion chamber; means for introducing a charge of heavy fuel into said heavy fuel vaporizing chamber to produce a heavy fuel vapor; walls forming an auxiliary explosion chamber communicating with said heavy fuel vaporizing chamber; means for introducing an explosive mixture of air and light fuel into said auxiliary explosion chamber; means for maintaining the walls of said auxiliary explosion chamber at such a temperature that no ignition of said explosive mixture under compression can take place therein; and means in said auxiliary explosion chamber for igniting said explosive mixture.

8. In an internal combustion engine, the combination of: a cylinder block having a cylindrical bore; a piston moving in said bore but having its movement so limited that a considerable clearance space is left above the head of the piston at the end of its compression stroke, this clearance space forming an engine combustion chamber; walls forming a heavy fuel vaporizing chamber adjacent to and in open communication with but distinct from said engine combustion chamber; means for introducing a charge of heavy fuel into said heavy fuel vaporizing chamber to produce a heavy fuel vapor; means for heating the walls of said heavy fuel vaporizing chamber; walls forming an auxiliary explosion chamber communicating with said heavy fuel vaporizing chamber; means for introducing an explosive mixture of air and light fuel into said auxiliary explosion chamber; means for maintaining the walls of said auxiliary explosion chamber at such a temperature that no ignition of said explosive mixture under compression can take place therein; and means in said auxiliary explosion chamber for igniting said explosive mixture.

9. In an internal combustion engine, the combination of: a cylinder block having a cylindrical bore; a piston moving in said bore but having its movement so limited that a considerable clearance space is left above the head of the piston at the end of its compression stroke, this clearance space forming an engine combustion chamber; walls forming a heavy fuel vaporizing chamber adjacent to and in open communication with but distinct from said engine combustion chamber; means for introducing a charge of heavy fuel into said heavy fuel vaporizing chamber to produce a heavy fuel vapor; walls forming an auxiliary explosion chamber communicating with said heavy fuel vaporizing chamber; means for introducing an explosive mixture of air and light fuel into said auxiliary explosion chamber; means for maintaining the walls of said auxiliary explosion chamber at such a temperature that no ignition of said explosive mixture under compression can take place therein; a spark plug in said auxiliary explosion chamber; and means for energizing said spark plug after the air is compressed in said cylinder combustion chamber.

In testimony whereof, I have hereunto set my hand at San Francisco, California, this 3d day of August, 1923.

ADOLPH A. TACCHELLA.